United States Patent [19]

Levins

[11] 4,205,404
[45] Jun. 3, 1980

[54] TOILET TRAINING DEVICE

[76] Inventor: Drew E. Levins, 6416 Renssalaer Dr., Bradenton, Fla. 33507

[21] Appl. No.: 962,229

[22] Filed: Nov. 20, 1978

[51] Int. Cl.² .............................................. E03D 11/00
[52] U.S. Cl. ........................................... 4/254; 4/661; 4/449
[58] Field of Search .................. 4/134, 254, 177, 1

[56] References Cited

U.S. PATENT DOCUMENTS

| 1,297,177 | 3/1919 | Johnson | 4/254 UX |
| 2,120,481 | 6/1938 | Bentz | 4/254 |
| 2,122,832 | 7/1938 | Bentz | 4/254 |
| 2,607,926 | 8/1952 | De Puy | 4/254 |
| 2,962,112 | 11/1960 | Ramsberger | 4/177 UX |

Primary Examiner—Henry K. Artis
Attorney, Agent, or Firm—Robert B. Kennedy

[57] ABSTRACT

A toilet training device for children is disclosed comprising a portable stairway and a toilet seat mounted to an upper portion of the stairway for pivotable movement about a pivot axis onto the top of an auxiliary toilet bowl. Means are provided for adjusting the height of the pivot axis whereby the seat may be placed substantially level atop auxiliary toilet bowls of diverse heights.

4 Claims, 3 Drawing Figures

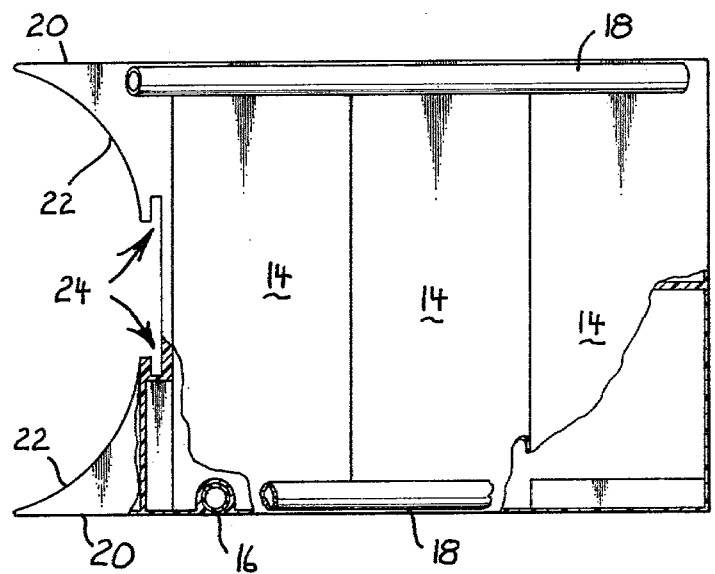
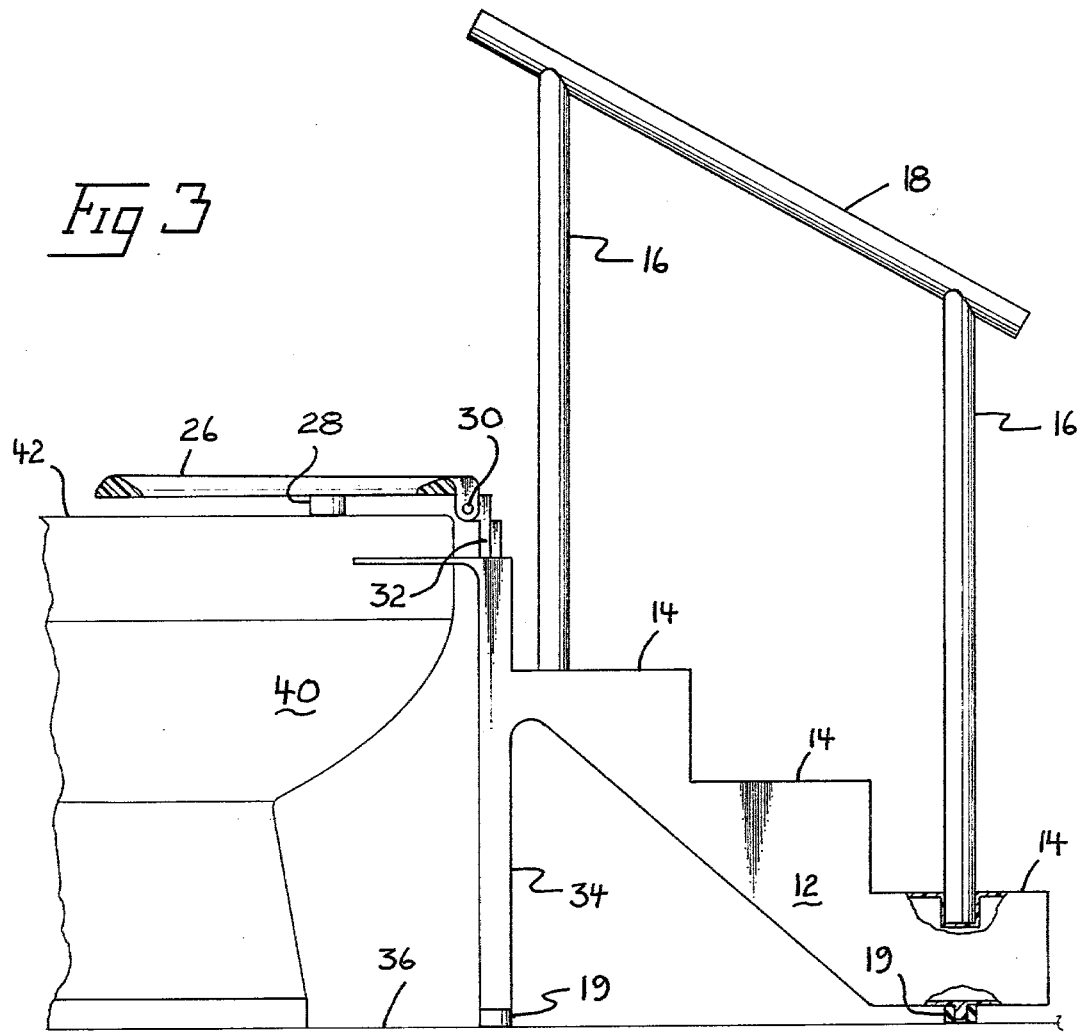

TOILET TRAINING DEVICE

BACKGROUND OF THE INVENTION

This invention relates to devices for the toilet training of children.

As is well known, small children must be trained in the proper use of toilet facilities. As standard adult toilets are too large and inaccessible for small children, small scale toilets have been specially developed for them. For example, in U.S. Pat. No. 1,700,959 a combination nursery step and stool is disclosed having a low toilet seat under which a chamber pot or bowl may be supported. A step is mounted below and to the front of the seat to enable a child to climb onto the seat. For larger children devices have been developed for use in conjunction with adult size toilets. In U.S. Pat. No. 2,607,926, for example, a combination nursery chair and step-stool is disclosed having a frame to which steps are mounted leading to a toilet seat which is hinged to the frame. This device is sized so as to be capable of being positioned over a standard adult toilet bowl. Being taller and of skeletal construction this device presents some danger to children in that they may slip and lodge a body member between structural members of the device and toilet. That a body of water is present here further adds to the degree of hazard present. However, this type of a device does eliminate the need for regular cleaning of chamber pots.

The present invention has for a general object the provision of an improved toilet training device for children.

More specifically, it is an object of the invention to provide a toilet training device which may be used in cooperation with conventional adult toilet bowls.

Another object of the invention is to provide a toilet training device which may be used with toilet bowls of diverse heights.

Still another object of this invention is to provide a toilet training device of relatively simple and economic construction and which may be utilized with a high degree of safety.

SUMMARY OF THE INVENTION

In one form of the invention a toilet training device for children is provided comprising a portable stairway and a toilet seat mounted to an upper portion of the stairway for pivotable movement about a generally horizontal axis onto the top of an auxiliary toilet bowl. The device also includes means for adjusting the height of the pivot axis whereby the toilet seat may be laid generally level atop auxiliary bowls of diverse heights.

In another preferred form of the invention a toilet training device for children is provided comprising a portable base of generally rigid structure defining a set of stairs ascending to a top ledge. The ledge has an edge contoured to be placed in contact with the front of an auxiliary toilet bowl. The device further comprises a toilet seat and means for pivotably mounting the toilet seat to the base adjacent the ledge for movement into a generally level position supported atop the auxiliary toilet bowl.

BRIEF DESCRIPTION OF THE DRAWING

FIG. 2 is a plan view of the base portion of the toilet training device shown in FIG. 1.

FIG. 3 is a side elevational view of the toilet training device of FIG. 1 shown positioned adjacent an auxiliary toilet bowl for use.

DESCRIPTION OF THE PREFERRED EMBODIMENTS

Figure 1:
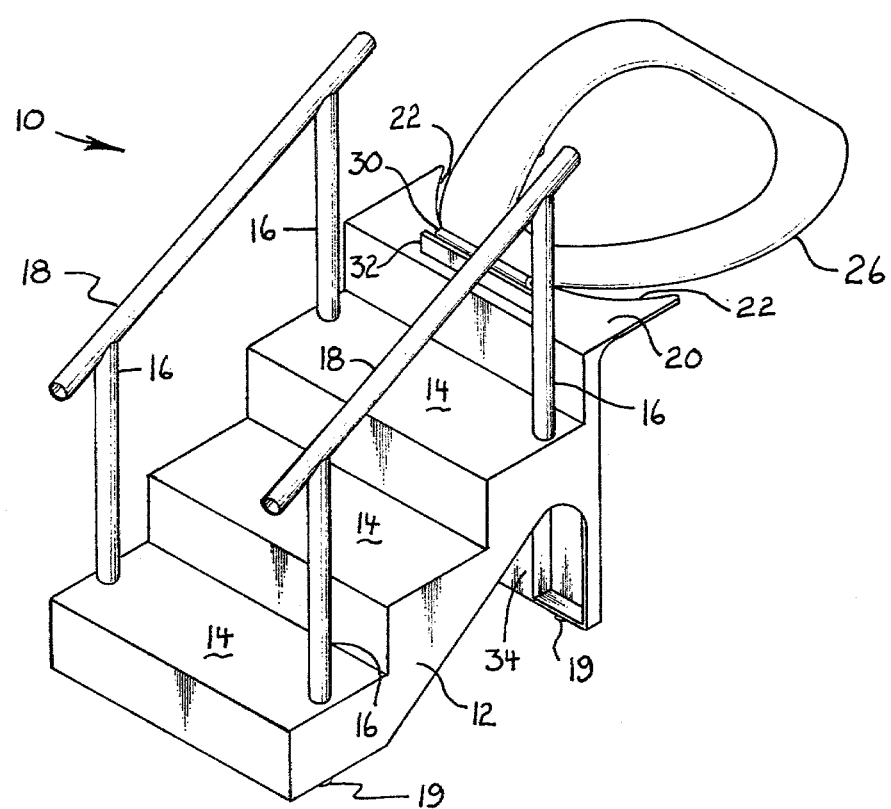
FIG. 1 is a perspective view of a toilet training device embodying principles of the invention in one preferred form.

Referring now in more detail to the drawing, there is shown a toilet training device 10 having a portable, generally rigid base 12 the upper surface of which is provided with a set of stairs 14 forming a stairway. A pair of upright posts 16 is mounted to each side of the stairway with each pair supporting a railing or banister 18. Rubber grommets 19 are mounted beneath the base.

The top of the stairway is seen to form a horizontally cantilevered ledge 20. Wing portions of the edge 22 of the ledge distal the stairs is seen to be generally concave. A central portion of this edge however is seen to define a slot lip or orifice 24.

With continued reference to the drawing the toilet training device is further seen to include a toilet seat 26 having resilient, hard rubber pads 28 mounted therebeneath. The toilet seat is hinged by a pivot pin 30 to the upper end of an upright slide board 32. The slide board 32 extends slidably down through the slot lip 24 into the upper surface of ledge 20 and into a vertically extending channel or race within a rear upright stand portion 34 of the base.

In use the toilet seat 26 may be first raised between ledge edges 22 from a stored position depending downwardly from pivot pin 30 in front of base stand portion 34. The portable base may then be positioned atop a floor 36 with the concave edge 22 of ledge 20 in contact with the front of a standard toilet bowl 40. In this position the training device exhibits a high degree of stability in view of the frictional contact provided by grommets 19 with the floor and with the ledge edge in abutment with the bowl. The toilet seat 26 may then be laid atop the upper surface 42 of the toilet bowl. Should this surface be at a height greater than pin 30 the slide board 32 may be raised within the race and slot 24 to accomodate for such height adjustment. A child may then easily climb the device stairway to sit upon the seat.

It thus is seen that a toilet training device is provided of simple, economic and safe construction. The device may be used with adult toilet bowls and thereby eliminate the need for flushing. Furthermore, the device may be easily used with auxiliary toilet bowls of diverse heights without the need for locating the device seat upon an incline.

It should be understood that the just described embodiments merely illustrate principles of the invention in one preferred form. Many modifications, additions and deletions may, of course, be made thereto without departure from the spirit and scope of the invention as set forth in the following claims.

What is claimed is:

1. A toilet training device for children comprising, in combination, a portable stairway, with an upper portion of said stairway provided with a slot, a toilet seat mounted adjacent said upper portion of said stairway for pivotable movement about a generally horizontal pivot axis onto the top of an ancillary toilet bowl, and means for adjusting the height of said pivot axis including a slide board positioned within said slot atop which said toilet seat is pivotably mounted whereby the toilet seat may be laid generally level atop auxiliary toilet bowls of diverse heights.

2. A toilet training device in accordance with claim 1, wherein an upper portion of said stairway is formed with a cantilevered ledge having a generally concave edge sized to be placed in contact with the front of an auxiliary toilet bowl.

3. A toilet training device for children comprising a portable base of rigid structure defining a set of stairs ascending to a top ledge having an edge contoured to be placed in contact with the front of an auxiliary toilet bowl; a toilet seat; and means for pivotably mounting said toilet seat to said base adjacent said ledge for movement into a generally level position supported atop the auxiliary toilet bowl which includes an upright slide board to the top of which said toilet seat is pivoted.

4. A toilet training device in accordance with claim 3 wherein said base ledge defines a slot through which said slide board vertically extends.

* * * * *